United States Patent Office 3,294,647
Patented Dec. 27, 1966

3,294,647
PROCESS FOR PRODUCING SPORES
Surendra Nath Sehgal, St. Laurent, Quebec, Kartar Singh, Beaconsfield, Quebec, and Claude Vezina, Oka, Quebec, Canada, assignors, by mesne assignments, to Wisconsin Alumni Research Foundation, Madison, Wis., a corporation of Wisconsin
No Drawing. Filed May 18, 1964, Ser. No. 368,396
3 Claims. (Cl. 195—81)

The present invention relates to the production of spores and more specifically to the improved process of harvesting spores of spore forming molds or the like including spores of Aspergillus, Streptomyces, etc. The spores are recovered in highly active form and are especially adaptable for use in the Knight spore process described below.

The microbiological production of chemical compounds of the steroid type in fermentation media containing nutrients such as cornsteep liquor, soybean meal, enzymatic digest of lactalbumin (Edamin) and the like, along with carbohydrates such as molasses, sucrose, dextrose, etc., is well known. Peterson et al., J. Am. Chem. Soc. 74, 5933 (1952); Dulaney et al., Appl. Microbiol., 3, 336 (1955). See also Fried et al. Patent 2,753,290 and Thoma et al. Patent 2,753,162. As the fermentation media provide assimilable sources of both nitrogen and carbon, spores germinate and grow in these media and the conversion of the steroids takes place in the resulting fermented "beer" containing vegetative growth material (mycelium) as well as the nutrient material including degradation products thereof. The recovery of the converted steroid in good yield from this complex mixture has obviously posed problems.

The microbiological production of chemical compounds by the improved Knight spore process is also now well known. Knight, U.S. Patent No. 3,031,379. In the Knight spore process the conversion of the steroid takes place in the presence of spores in a substantially nutrient-free medium in which the spores cannot germinate and grow. The recovery of the converted steroid in good yield from the relatively clean, vegetative growth material-free, reaction mixture is obviously much easier than from the heavy vegetative growth material containing fermentation mixtures. See Knight patent, supra.

Production of spores for use in the Knight spore process, e.g. for large scale, commercial-type operations, has posed problems where the microbiological organism (filamentous fungi, mold or the like) employed does not sporulate well or produce large amounts of spores in submerged culture. In our initial investigations, for example, we confirmed previous reports that Aspergillus ochraceus, a mold producing spores of a preferred type for use in the Knight spore process, would not sporulate in submerged culture. In view of this, to obtain spores of A. ochraceus for use in the spore process it was found necessary to use surface culture, e.g. a glucose-neopeptone medium (Sabouraud's medium) solidified with 2 percent agar, and recover the spores by scraping and brushing and washing the spores from the surface of the nutrient medium. See Knight patent, supra. Aside from the fact that scraping and brushing are required to free the spores from a medium of this type and that this frequently resulted in excessive contamination of the spores with nutrient material and with mycelial fragments, coupled with the fact that this operation per se does not lend itself to the production of spores on a large scale, this procedure proved particularly objectionable due to the release of large amounts of spores into the air. This not only resulted in a loss of spores, but posed a possible serious problem to the exposed spore harvesting operators breathing the air contaminated with the spores.

The principal object of the present invention is to provide improved processes of producing and recovering spores of spore forming molds adaptable for large scale commercial operations.

More specific objects of the present invention are (1) to provide an improved process of producing highly active spores of A. ochraceus and of other spore forming molds in large amounts in a reasonably short time and (2) to provide an improved process of recovering the resulting spores with relatively little contamination and without scraping and brushing and releasing of the spores to the atmosphere.

Other objects of the invention will be apparent as the description proceeds.

In our investigations in an attempt to solve the A. ochraceus spore production problem, we investigated various types of nutrient media including solid and liquid media. They proved objectionable either because they did not produce the desired large amounts of spores or because of the difficulties involved in recovering the spores in good yield from the nutrient media frequently contaminated with large amounts of mycelium.

In continued investigations we discovered that pot barley, a coarse barley grain commercially available as pot barley, and wheat bran, were excellent solid media for producing highly active spores of A. ochraceus, and that the spores could be readily produced by inoculating sterile moist pot barley, or moist wheat bran, with a culture of A. ochraceus and culturing the resulting mixture with aeration for about 4–10 days. We also unexpectedly discovered that the spores could be readily harvested or recovered in good yield and with relatively little contamination from the solid culture medium made up of pot barley or wheat bran, by adding water to the culture, agitating the mixture to form an aqueous suspension of the spores and then removing the aqueous spore suspension from the solid culture medium. We have found that flasks, trays, chambers, autoclaves, or rotating autoclaves are suitable containers for carrying out the above process.

Similarly, spores of the following spore forming molds were also obtained: *Septomyxa affinis; Mucor griseocyanus; Stachylidium theobromae; Didymella lycopersici; Didymella vodakii; Pestalotiopsis funerea; Pestalotiopsis funerea var. discolor; Verticillium theobromae (Stachylidium theobromae); Stachylidium bicolor (Verticillium bicolor); Fusarium moniliforme; Rhizopus (reflexus) circinans; Gliocladium catenulatum; Gliocladium roseum; Aspergillus flavipes; Chaetomella oblonga; Trichothecium roseum;* Pycnosporium sp.; *Saccharomyces pastorianus; Cunninghamella elegans; Chaetomella raphigera; Penicillium chrysogenum; Aspergillus niger; Fusarium javanicum var. ensiforme; Fusarium oxysporum var. lini; Fusarium solani;* Penicillium sp. Adamis; *Penicillium patulum (P. urticae); Streptomyces griseus; Streptomyces erythreus; Streptomyces diastaticus; Streptomyces microflavus; Streptomyces rimosus; Streptomyces lavendulae; Streptomyces olivochromogenus; Fusarium conglutinans.*

The following examples will serve to illustrate the invention.

*Example 1*

Two thousand grams of pot barley was weighed in a 3½ gallon (approximately 15 liters) capacity glass carboy and moistened with 400 ml. of tap water. The carboy was plugged with cotton and sterilized in an autoclave at 121° C. for one hour. When the carboy had cooled to 28° C. it was inoculated with 25 ml. of a spore suspension of A. ochraceus containing about one million spores per ml. Aeration was provided for by replacing the cotton plug with a two-hole rubber stopper and by inserting a glass (Pyrex) tube in one hole so that it extends approximately to the bottom of the carboy to serve as the air inlet and by inserting a short glass tube in the other hole in the stopper to serve as the air outlet. Both tubes were provided with conventional cotton or glass wool filters and all pieces of equipment were sterile, i.e. had been previously sterilized. The inoculated carboy was incubated at about 28° C. with aeration at a rate of about 0.5 volume of air per minute and in an atmosphere containing about 50–55% relative humidity. The maximum yield of spores was obtained in about 4–10 days. To harvest the spores, 2 to 3 liters of water was added to the carboy, the mixture shaken to dislodge the spores and the resulting spore suspension decanted with filtering through glass wool. The spores were recovered by centrifuging the suspension and washed with water in accordance with conventional procedures. Mineral salts and additional sources of nitrogen may be added to the pot barley prior to sterilization. Also, to aid in the formation of the spore suspension, a small amount of a surface active agent, e.g. sorbitan monooleate (Tween 80) can be added to the water if desired.

*Example II*

This example is in accordance with Example I, except that 1000 g. of wheat bran was used in place of pot barley. All other conditions were identical and large amounts of spores of *A. ochraceus* were obtained as in Example I.

*Example III*

5,000 grams of pot barley was moistened with 500 ml. of tap water and pasteurized at 121° C. for 45 minutes in an open pan. 250 ml. of tap water was added to the pasteurized pot barley and the mixture was added to a tank made up of a stainless steel cylinder about 30" long and 16" in diameter, of approximately 100 liter capacity. Each end of the cylinder was fitted with a stainless steel cover with an outlet, about ¼" in diameter, and with a stainless steel screen, 10-mesh, the same diameter as the cylinder. The tank, filled with the pot barley, was autoclaved at 121° C. for one hour. After the tank had cooled to 28° C. it was inoculated with 50 ml. of the spore suspensions described in Example I. The tank was then placed vertically on a table, the bottom or lower outlet was connected to a sterile air supply (0.5 volume/minute) and the top or upper outlet was connected to a cotton filter and incubation was carried out as in Example I. At the end of the incubation period, the upper outlet was connected to a sterile water supply and the lower outlet was disconnected from the air supply and closed. About three liters of sterile water were added through the upper outlet and the outlet closed and the tank placed horizontally on slowly moving rollers for agitation to bring the spores in suspension. The tank was then placed vertically on a table, and the spore suspension drained through the lower outlet, and the process of harvesting repeated once. The combined spore suspension was then worked up as described in Example I.

*Example IV*

This example is in accordance with Example III, except that 2500 g. of wheat bran were used in place of the pot barley used in Example III.

A preferred method for use in large scale operations follows the general procedure of Examples III and IV except that the pot barley or wheat bran is maintained in separate shallow layers, e.g. 2–3 inches deep, on a plurality of porous screens positioned one above the other in the cylinder or tank or like confined zone. Maintaining the pot barley or wheat bran in relatively shallow layers in the tank as distinguished from a single bulk mass, has been found to aid materially in obtaining proper sterilization of the pot barley or wheat bran prior to inoculation with the spore suspension, and also to aid materially in obtaining proper aeration during incubation.

Illustrative modifications of the above processes were carried out using pot barley and wheat bran with the following microorganisms and in the following types of containers: *A. ochraceus* in Fernbach flasks, trays, chambers, and rotating autoclaves; *Septomyxa affinis* in Fernbach flasks and in trays; *Mucor griseocyanus* in Fernbach flasks, and *Stachylidium theobromae* in Fernbach flasks and in trays.

The use of the pot barley or wheat bran in the processes described above has proven satisfactory (1) because it provides a high yield of highly active spores in a reasonable time and (2) because the spores can be readily recovered from the pot barley or wheat bran in aqueous suspension form with little contamination. This last feature which can pose a difficult problem (see Schweiger Patent No. 3,000,791, column 3), is of utmost importance for unless the spores can be readily harvested, i.e. separated from the solid culture medium, the process would not be feasible for use in large scale commercial operations. This problem is solved by the process of the present invention.

It is claimed:
1. The process of producing spores of the spore forming molds *Septomyxa affinis*; *Mucor griseocyanus*; *Stachylidium theobromae*; *Didymella lycopersic*; *Didymella vodakii*; *Pestalotiopsis funerea*; *Pestalotiopsis funerea* var. *discolor*; *Verticillium theobromae* (*Stachylidium theobromae*); *Stachylidium bicolor* (*Verticillium bicolor*); *Fusarium moniliforme*; *Rhizopus* (*reflexus*) *circinans*; *Gliocladium catenulatum*; *Gliocladium roseum*; *Aspergillus flavipes*; *Chaetomella oblonga*; *Trichothecium roseum*; *Pycnosporium sp.*; *Saccharomyces pastorianus*; *Cunninghamella elegans*; *Chaetomella raphigera*; *Penicillium chrysogenum*; *Aspergillus niger*; *Fusarium javanicum* var. *ensiforme*; *Fusarium oxysporum* var. *lini*; *Fusarium solani*; *Penicillium sp.* Adamis; *Penicillium patulum* (*P. urticae*); *Streptomyces griseus*; *Streptomyces erythreus*; *Streptomyces diastaticus*; *Streptomyces microflavus*; *Streptomyces rimosus*; *Streptomyces lavendulae*; *Streptomyces olivochromogenus*; or *Fusarium conglutinans*, which comprises inoculating a sterile moist solid culture medium selected from the group consisting of pot barley and wheat bran, with any of said molds, culturing the resulting mixture with aeration for a time sufficient to produce spores of the mold, adding water to the culture mixture, agitating the aqueous culture mixture, and removing the resulting aqueous spore suspension from the solid culture medium.

2. The process of claim 1 where the mold is *A. ochraceus*.

3. The process of claim 1 wherein the said molds are cultured in separate shallow layers of cultured medium.

References Cited by the Examiner

UNITED STATES PATENTS 3,000,791  9/1961  Schweiger _____ 195—36

A. LOUIS MONACELL, *Primary Examiner.*

L. M. SHAPIRO, *Assistant Examiner.*